(12) United States Patent
Avritzer et al.

(10) Patent No.: US 8,381,170 B2
(45) Date of Patent: Feb. 19, 2013

(54) TEST DRIVEN ARCHITECTURE ENABLED PROCESS FOR OPEN COLLABORATION IN GLOBAL

(75) Inventors: Alberto Avritzer, Mountainside, NJ (US); Johannes P. Ros, Bridgewater, NJ (US)

(73) Assignee: Siemens Corporation, Iselin, NJ (US)

( * ) Notice: Subject to any disclaimer, the term of this patent is extended or adjusted under 35 U.S.C. 154(b) by 1483 days.

(21) Appl. No.: 11/946,127

(22) Filed: Nov. 28, 2007

(65) Prior Publication Data

US 2008/0134134 A1 Jun. 5, 2008

Related U.S. Application Data

(60) Provisional application No. 60/868,109, filed on Dec. 1, 2006.

(51) Int. Cl.
*G06F 9/44* (2006.01)

(52) U.S. Cl. .................. 717/101; 717/109; 717/124

(58) Field of Classification Search .................. None
See application file for complete search history.

(56) References Cited

U.S. PATENT DOCUMENTS

| | | | | |
|---|---|---|---|---|
| 6,405,364 | B1 * | 6/2002 | Bowman-Amuah | 717/101 |
| 7,139,999 | B2 * | 11/2006 | Bowman-Amuah | 717/101 |
| 7,370,315 | B1 * | 5/2008 | Lovell et al. | 717/100 |
| 7,770,151 | B2 * | 8/2010 | Sanjar et al. | 717/109 |
| 2003/0028579 | A1 * | 2/2003 | Kulkarni et al. | 717/101 |
| 2003/0192029 | A1 * | 10/2003 | Hughes | 717/101 |
| 2004/0073889 | A1 * | 4/2004 | Baecker et al. | 717/124 |
| 2004/0093580 | A1 * | 5/2004 | Carson et al. | 717/101 |
| 2004/0117759 | A1 * | 6/2004 | Rippert et al. | 717/100 |
| 2004/0143811 | A1 * | 7/2004 | Kaelicke et al. | 717/101 |
| 2004/0261053 | A1 * | 12/2004 | Dougherty et al. | 717/101 |
| 2005/0039169 | A1 * | 2/2005 | Hsu et al. | 717/124 |
| 2005/0114829 | A1 * | 5/2005 | Robin et al. | 717/101 |
| 2006/0041856 | A1 * | 2/2006 | Holloway et al. | 717/101 |
| 2006/0123389 | A1 * | 6/2006 | Kolawa et al. | 717/101 |
| 2006/0168558 | A1 * | 7/2006 | de Seabra e Melo et al. | 717/105 |
| 2007/0006124 | A1 * | 1/2007 | Ahmed et al. | 717/101 |
| 2007/0157165 | A1 * | 7/2007 | Kim | 717/109 |
| 2008/0082957 | A1 * | 4/2008 | Pietschker et al. | 717/101 |
| 2008/0178154 | A1 * | 7/2008 | Basler et al. | 717/124 |
| 2008/0196000 | A1 * | 8/2008 | Fernandez-Ivern et al. | 717/101 |
| 2008/0256517 | A1 * | 10/2008 | Atkin et al. | 717/124 |

OTHER PUBLICATIONS

Barry Boehm et al., Software Development cost estimation approaches—A survey; 2000; [online]; retrieved on Dec. 22, 2012; pp. 177-205; Retrieved from the Internet: <URL: http://homepages.dcc.ufmg.br/~rodolfo/es-1-09/EstimationSurvey.pdf>.*

Carol Righi and Janice James; User-Centered Design Stories: Real-World UCD Case Studies (Abstract only); 2007; [online]; retrieved on Dec. 22, 2012; p. 1; Retrieved from the Internet: <URL: http://dl.acm.org/citation.cfm?id=1534409&coll=DL&dl=GUIDE&CFID=160396086&CFTOKEN=45379875>.*

Walter Kern et al.; The Dimension Architecture: A New Approach to Resource Access; 2009; [online]; retrieved on Dec. 22, 2012; pp. 1-17; Retrieved from the Internet: <URL: http://ieeexplore.ieee.org/stamp/stamp.jsp?tp=&arnumber=5282493>.*

* cited by examiner

*Primary Examiner* — Thuy Dao
*Assistant Examiner* — Hanh T Bui

(57) ABSTRACT

A method for developing a software project includes identifying business cases and goals for the software project, defining a common interface architecture through which components of the software project are to be integrated, identifying software project components to be integrated over the common interface, defining high level requirements of the project components, elaborating the component interfaces and defining detailed component requirements, implementing the project components, testing the project components individually, defining integration tests for testing integrated components, and executing the integration tests on a set of integrated components.

17 Claims, 3 Drawing Sheets

TEST DRIVEN ARCHITECTURE ENABLED PROCESS FOR OPEN COLLABORATION IN GLOBAL

CROSS REFERENCE TO RELATED UNITED STATES APPLICATIONS

This application claims priority from "A Test Driven Architecture Enabled Process for Open Collaboration in Global Software Development Environments", U.S. Provisional Application No. 60/868,109 of Avritzer, et al., filed Dec. 1, 2006, the contents of which are herein incorporated by reference.

TECHNICAL FIELD

This disclosure is directed to a process to enable collaboration of global software development teams by defining a common architecture for collaboration and testing process to drive the pace of software development.

DISCUSSION OF THE RELATED ART

The overhead for managing global software development teams, for developing work packages and defining the detailed requirements for each work package severely constrains the scalability, productivity and quality of work performed in global software development environments. The development of detailed requirements typically consumes most of project resources. In addition, requirements churn has been reported as a major source of project delays. The performance rating of remote groups of software developers is usually done by defining evaluation criteria and performing a subjective evaluation of each team by a group of experts that are centrally located.

The current mode of operation requires extensive documentation efforts ahead of development activities by a central team and the manual evaluation of remote teams by a group of experts. In a global distributed software development environment it is useful to be able to objectively evaluate the performance of remote teams, without taking into account cultural factors.

The current mode of operation of using a central team to perform project management, requirements, architecture, and integration and testing incurs very large overhead for the central team and limits the number of teams that could productively participate.

Other approaches to global software have been investigated. Model-Driven Rapid Application Development (MDRAD) is an agile reference process for globally distributed development. MDRAD provides guidelines for team and organizational structure, communication mechanisms and patterns, and high-level task allocation. While these guidelines have proven to be helpful, additional guidelines and methods are needed to make the process more efficient, and to allow it to scale. Specifically, MDRAD focuses on central team definition of requirements, and lacks guidelines and methods for enabling open collaboration, quantitatively rating teams' performance, and for allocating work packages efficiently.

Other processes frequently practiced include the Unified Process (UP), and a variant of UP known as the Rational Unified Process (RUP). Both UP and RUP suggest mechanisms for collecting metrics, which are quantitative ways to look at performance, but these metrics look at the project as a whole with the intent to gain insights on how to improve the process. Both processes also give guidance for work allocation through defining phases, artifacts, and roles. However, neither UP nor RUP address quantitative performance ratings to do team comparisons, and efficient work allocation based on team performance. In addition, these methods primarily focus upstream on requirements and development.

Two additional processes that are gaining acceptance in industry are SCRUM and eXtreme Programming (XP). Both are light-weight, agile processes. SCRUM suggests mechanisms for collecting performance metrics, but like UP and RUP, the metrics are for the project as a whole, and are used as input for improving the process. XP suggests a mechanism for work allocation that allows teams to select there own tasks, but does not take into account the team's previous performance when allowing them to make their selection. Another process, Deterministic State Testing Approach (DST), is a test case generation and execution approach that was developed for telecommunication systems that could be modeled as continuous time Markov chains.

In addition, it may be possible to distribute early phase activities rather than collocating them within a central team. Individual development teams may also be distributed such that differing roles may be distributed across multiple sites. The distributed teams may use coordination and communication techniques such as "SCRUM of SCRUMS". Functional roles may also be allocated to collocated teams such that development is done in one location, testing in another, etc. "Follow the Sun" approaches have also been applied where different teams work on the same code base during their work day and then turn over their code to another team(s) located to the west of them. Similarly, different time zones can be used such that a test team is finding defects while the developers are sleeping and the developers are fixing bugs while the testers are sleeping. Of course, the success of all of these approaches also depends on the skill levels of the staff, project size, complexity, and company and country culture.

Some software engineering tasks are better performed with a small team who works within one room. In such teams communications are efficient and effective. Such teams are used for tasks such as system architecture design where many tradeoffs need to be looked at simultaneously and architects can try out their approaches by writing them on a whiteboard for the other architects to review. As design alternatives are reviewed, accepted or rejected, the white boards are erased often. After some fixed period of time or after the team reaches consensus, the information on the white board is "frozen" and described within an architecture description document.

When domain experts are from different locations, there's a travel burden for some of them to achieve the all in one room design approach. If planned well, the writing of the architecture description document can be done during the two weeks at home. A benefit of today's global software development environment is that in theory the best skills can be found anywhere to apply to a technical solution. However, when distributed teams need to perform tasks within a physical room, team members may resent leaving their home offices for frequent and extended travel to a "foreign work room". If collaboration processes and tools can be used to simulate the system design work room with experts physically spread across multiple sites, software architects may have a better chance to live and work where they choose rather than where the work is. Furthermore, architecture frameworks that are designed in advance of a project and reused across many projects may minimize the need for distributed design.

SUMMARY OF THE INVENTION

Exemplary embodiments of the invention as described herein generally include methods and systems for a test driven architecture enabled approach for open collaboration in global software development environments. An approach according to an embodiment of the invention uses a common architecture bus to enable open collaboration, a test driven approach to determine the pace of product development, and a quantitative method to rate the performance of software development teams in a distributed global development environment. In addition, a methodology is provided for the efficient management of remote teams that transfers most of the overhead of work allocation and quality assurance from the central team to the remote teams. A central enabler is used to identify domain experts and a quantitative approach for rating the performance of software development teams in a global distributed environment. Work packages are assigned to teams based on domain expertise. Team performance is linked to the quality of the work performed and to the team productivity. In addition, the approach increases team productivity by placing the teams in a collaborative and competitive environment. The focus is both upstream on architecture and downstream on testing.

A common architecture bus enables global distributed team collaboration, and the test teams can drive product development pace by defining test cases and deliverables to be met by the test cases. An approach according to an embodiment of the invention can be generalized by structuring a remote team into a multi-level tree hierarchy. Each intermediate node in the tree would represent a central team to the remote teams managed by it.

A global software development approach according to an embodiment of the invention can be fully automated.

According to an aspect of the invention, there is provided a method for developing a software project including identifying business cases and goals for the software project, defining a common interface architecture through which components of the software project are to be integrated, identifying software project components to be integrated over the common interface, defining high level requirements of the project components, elaborating the component interfaces and defining detailed component requirements, implementing the project components, testing the project components individually, defining integration tests for testing integrated components, and executing the integration tests on a set of integrated components.

According to a further aspect of the invention, the method includes identifying a domain expert for each project component, where the domain experts define the high level requirements of the project components.

According to a further aspect of the invention, the method includes forming testing and development teams, where members of the testings and development teams are identified by the domain expert for each component.

According to a further aspect of the invention, the steps of elaborating the component interfaces and defining detailed component requirements, implementing the project components, and testing the project components individually are performed by the development teams.

According to a further aspect of the invention, the steps of defining integration tests for testing integrated components, and executing the integration tests on a set of integrated components are performed by the testing team.

According to a further aspect of the invention, the method includes, for each component, identifying component features that can be developed and tested over a time period on the order of a few weeks, and implementing the component features.

According to a further aspect of the invention, the method includes integrating component features into the software project on a website executing the common interface.

According to a further aspect of the invention, the method includes rating each development according to a number of open defects existing after component feature development and testing time period.

According to a further aspect of the invention, the rating comprises adding a predetermined number of points minus the number of open defects to a predetermined initial rating.

According to another aspect of the invention, there is provided a method for developing a software project including identifying business cases and goals for the software project, identifying a domain expert for each project component, where the domain experts define the high level requirements of the project components, defining a common interface architecture through which components of the software project are to be integrated, identifying software project components to be integrated over the common interface, defining high level requirements of the project components, and for each component, identifying component features that can be developed and tested over a time period on the order of a few weeks, and implementing the component features.

According to a further aspect of the invention, the method includes forming testing and development teams, where members of the testing and development teams are identified by the domain expert for each component.

According to a further aspect of the invention, the method includes elaborating the component interfaces and defining detailed component requirements, implementing the project components, and testing the project components individually, where the steps are performed by the development teams.

According to a further aspect of the invention, the method includes defining integration tests for testing integrated components, and executing the integration tests on a set of integrated components, where the steps are performed by the testing team.

According to a further aspect of the invention, the method includes integrating component features into the software project on a website executing the common interface.

According to another aspect of the invention, there is provided a program storage device readable by a computer, tangibly embodying a program of instructions executable by the computer to perform the method steps for developing a software project.

DETAILED DESCRIPTION OF THE EXEMPLARY EMBODIMENTS

Figure 1:
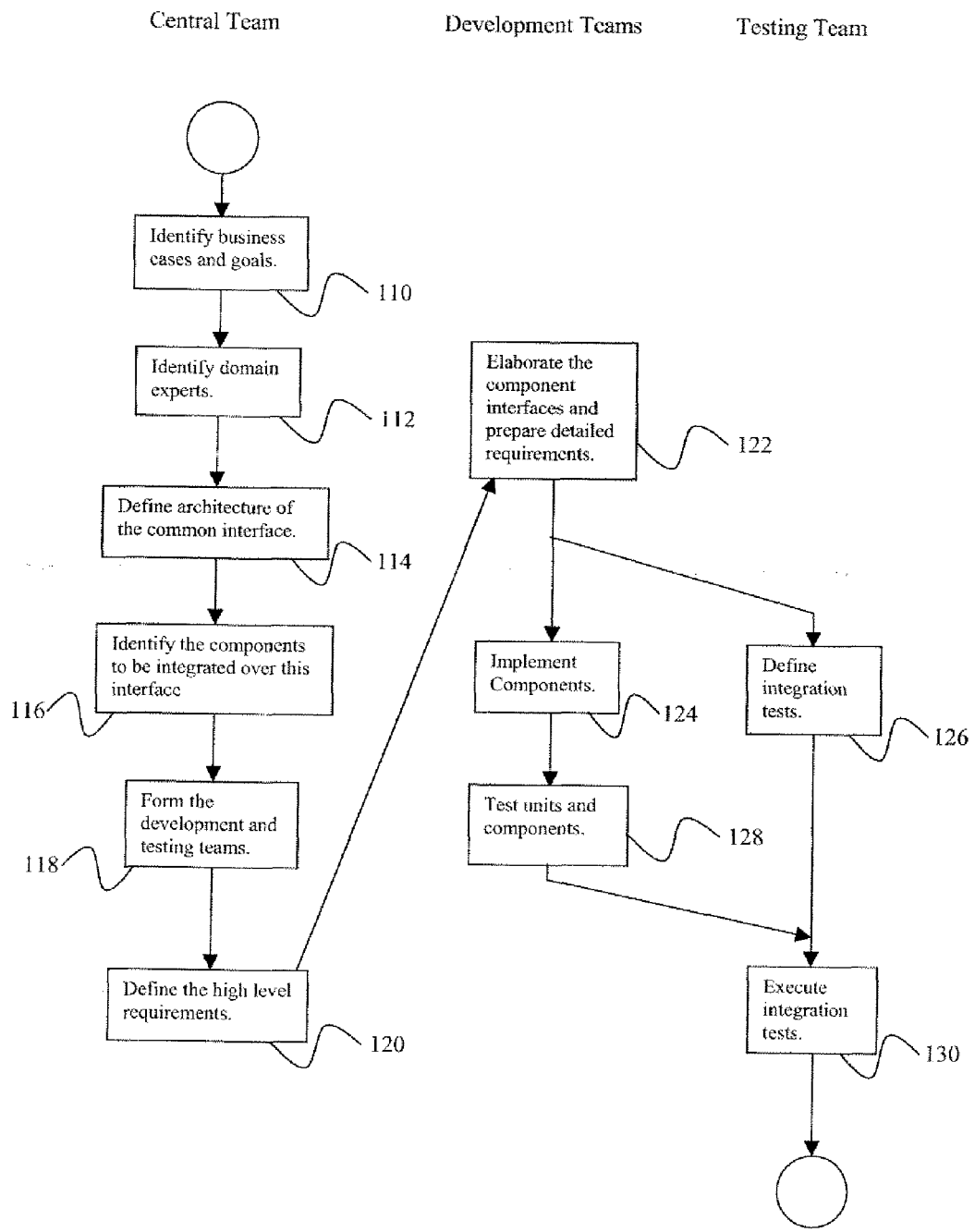
FIG. 1 is an activity diagram of a distributed development process that represents activities between teams that would typically take place, according to an embodiment of the invention.

Exemplary embodiments of the invention as described herein generally include systems and methods for enabling collaboration of global software development teams by defining a common architecture for collaboration and testing process to drive the pace of software development. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

A software development process starts by determining a common architecture bus that defines an interface for open collaboration, continues by identifying components to be integrated over this common architecture bus and identify domain experts on each component. These domain experts build remote software development teams, whose function is to integrate each component to the common architecture bus. The software testing team's function is to identify product instances that are composed of pairs of components to develop test cases and delivery times for software components to be tested in an integrated environment. An objective rating is computed based on the correct execution of the most likely paths in the components user interface. The software development teams are rated using a quantitative approach for rating remote software development groups, removing subjectivity in the evaluation criteria. This is useful for teams that operate in a global environment where cultural differences can play a decisive factor in the interactions to the central team. In one embodiment of the invention, the teams are organized in pairs of development teams (A) and testing teams (B). Testing team (B) develop tests for components developed by development teams (A), therefore increasing the overall quality of the products being developed. The rating of the teams is then used in the work allocation process to motivate teams, and to ensure that higher performing teams work on higher risk tasks.

An exemplary project team is organized into a central coordinating team a distributed architecture team, and several development and testing teams that are globally distributed. The central coordinating team is responsible for product identification and assignment of components to distributed development and testing teams. The central coordinating team can also act as test team lead. The central coordinating team is responsible for monitoring testing results and assigning performance rating of the development teams. As the process is test team driven, each test team will define product in two week functionality-packages, decompose the product into two-week tasks, and populate the product web site. To get the process started, each remote software development team will tentatively select the task it feels matches its domain expertise. The central coordinating team lead confirms the selection. Therefore, development and testing team have been paired into peer teams such that each development team has its work checked by a peer test team. The quality assurance of each component is performed by identifying the probability of occurrence in production of each use case/test case and by specifying the detailed tests for end-to-end activity covering most likely paths for component integration. As the components being integrated are full-fledged operating components, the test cases/use cases can be developed by inspecting the existing component user interface. Each software development team is initially rated with the same rating of N points. At the end of each two-week iteration the rating of a development team is incremented by $\Delta$ minus the number of open modification requests when the two week timer expires, usually at mid-night. In one non-limiting embodiment of the invention, $N=1500$ and $\Delta=25$. The productivity of the project management and testing phases can be increased by delegating to the remote teams the development of tests and the assignment of components to teams. In addition, teams that produce high-quality code with fewer defects can achieve a superior rating. This rating incorporates not only the productivity rate of each team, but also the quality of the work performed since the rating is dependent on the successful implementation component integration and execution of the most likely tests case.

According to an embodiment of the invention, a fully distributed development process is provided where remote teams can begin development without having to wait for the central team requirements specification effort. A fully distributed development process defines a common interface for component integration, to get the development teams started immediately with their code development activities. In such a development process, the architecture team is responsible for defining the common interface used for component integration, while the remote teams develop code to integrate their own components to the defined common interface. The world wide web architecture domain is an example where this architecture model was extremely successful. The world wide web's rapid scalability in the mid-nineties was enabled by the definition of the a common interface (the hypertext transfer protocol) and by the empowerment of domain experts on specific components to integrate their components to the common interface. The development of the world wide web is an example of a fully distributed development effort that was not constrained by resource availability of a central coordinating authority.

According to this embodiment of the invention, the following practices are incorporated in a software development process.

Hybrid centralized/distributed management: software process will still be developed and managed centrally. However, an architecture/requirements team composed of members of the central team and key members of the remote teams will be formed. The objective is to use domain knowledge about the large existing software components to help steer the overall requirements and system architecture specification effort. Software integration testing will be performed by a remote team.

Iterative Development: development and testing will be conducted in two week cycles following the same iterative methodology used above.

Encouragement of Communication between Remote Development and the Integration Testing Team: communication between development and the remote integration testing team will be encouraged. The central team will not be required to moderate the communication between the remote development teams and the integration testing team. However, the central team could choose to become involved in the communication between remote teams to ensure product development and testing is progressing as planned.

Formal Testing Specifications: testing specifications will be formal and will be provided by the remote integration testing team to the development teams on two-week cycle iterations.

Less formal Requirement Specifications: the upfront formal specification of the common interface between components and the availability of domain experts on the existing components will lessen the need for formal requirement specifications.

FIG. 1 shows an activity diagram that represents activities between teams that would typically take place when using a distributed software development process according to an embodiment of the invention. In one embodiment of the invention, the project team is organized into a central coordinating team a distributed architecture/requirements team, several remote development teams, and one remote integration testing team. The central coordinating team is responsible for product identification and assignment of components to distributed development. The remote teams are globally distributed. It should be noted, however, that there is considerable overlap between project management, the central team and the distributed architecture/requirements team. Project management serves only to get the project started but is not a team, and could be one person. In other embodiments of the invention, project management is performed by the central team. The requirements and architecture of a process of an embodiment of the invention are very lightweight, so in other embodiments of the invention, most of the activities can be executed by the central team and the development and testing teams, without having a distributed architecture/requirements team.

Referring now to the figure, a process according to embodiment of the invention starts with the central coordinating team forming the key teams and identifying the components to be developed. Business cases and goals are identified by the central team at block 110. At block 112, the central team identifies one domain expert for each identified component. An architecture/requirements team is formed at block 114 by the central team to define the common interface for component integration. This team defines the architecture of the common interface at block 116 and identifies the components to be integrated over this interface. Note, however, as discussed above, the functions of defining the interface architecture and identifying components to be integrated can also be performed by the central team in other embodiments of the invention. At block 118, the central team forms a remote software development team for each identified component and a remote software testing team to perform product integration testing. The central team defines the high level requirements for the project at block 120 with just enough detail so that the developments teams can start working. At block 122, the development teams elaborate the interfaces and prepare detailed requirements of their respective components. Based on these requirements, the development teams implement their respective components at block 124, while the testing teams define integration tests at block 126. The development teams test their components at block 128, and the testing teams use the results of these tests with the integration tests from block 126 to execute integration tests of the various components over the interface at block 130. As the components being integrated are full-fledged operating components, the test cases/use cases can be developed by inspecting the existing component user interface.

An implicit assumption here is that large components to be integrated have an existing and well documented interface. In addition, the domain expert on the component is an expert on this interface. Therefore, specification of a common interface for component integration is sufficient to drive the development of the software required for component integration. This can be expected to reduce the amount of upfront architecture and requirements work usually required from the central team.

Satisfying performance requirements and scalability requirements in software systems is challenging, and is more challenging in a global development environment. Global development is characterized by the complexity of making changes to the high level architecture after the teams are formed and responsibilities are divided among the global teams. Experienced architects know how to estimate the performance of system given the architecture, but modern software systems are often constructed using a complex integration of components, wrapping existing components and using multiple interface types. Such component based architecture facilitates partitioning development into global development teams, but this architecture also requires that the central design team be confident that the division of components can support the performance and scalability requirements of the system. Even experienced architects are challenged by performing an accurate analysis. Poor choices in the division of components or the choices of interface technologies can be expensive to change after global teams have been assigned responsibilities and development is in progress. Performance experts have well known techniques such as queuing networks that can be used to model and predict performance and scalability, but these techniques are not well known by many software professionals and are difficult to review by the software development team. Therefore, models built by a performance expert rely a great deal on the analysis skills of the performance expert and have the risk of not accurately reflecting the actual architecture as understood by the development team.

UML models are well understood by most system architects and recognized by most software professionals. Using a few simple annotations and by following a set of conventions, a performance model can be constructed using UML diagrams. This model can be converted into a recently proposed XML standard for queuing network analysis, known as the Performance Model Interchange Format (PMIF). From this XML file a performance analysis can be performed to predict the performance of the system and also can serve as the basis for performance testing of the system. The UML model can be easily reviewed by the architects, the stakeholders, and the development team to ensure that the performance model reflects the proposed design. This analysis can be performed before the distributed development teams are fully committed to the component design of the system.

Figure 2:
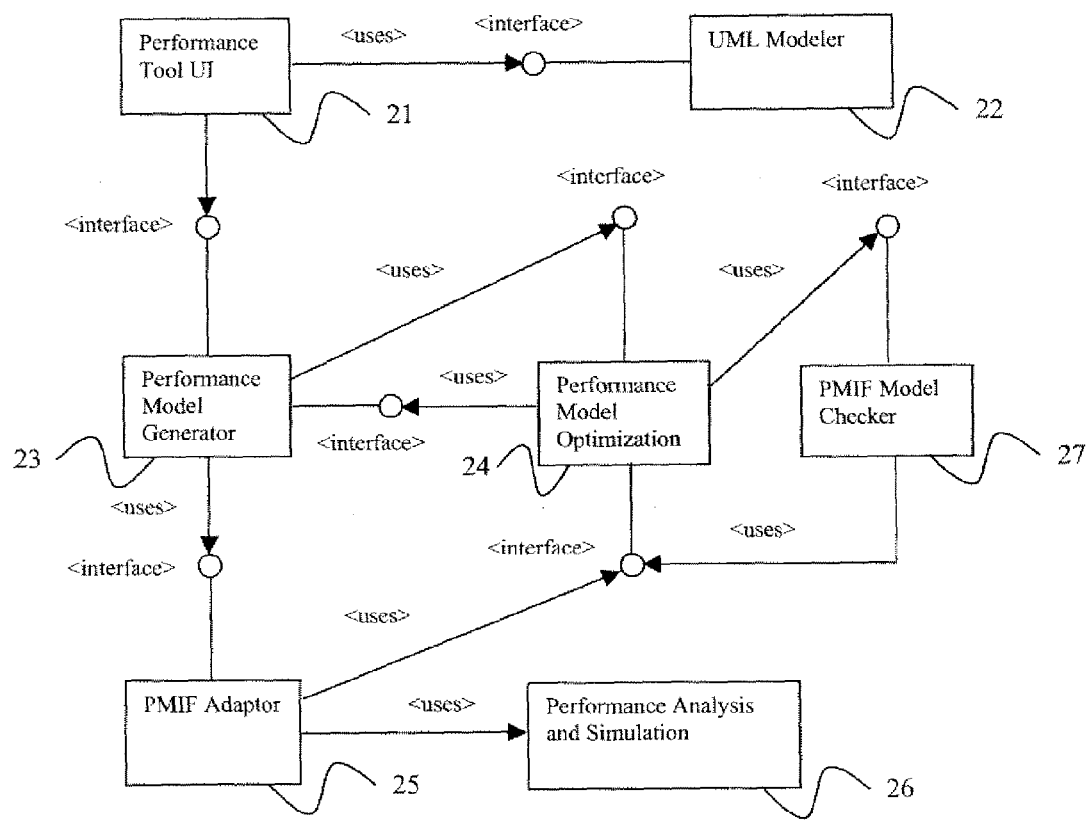
FIG. 2 is a block diagram of the components of a TDE-UML-PM according to an embodiment of the invention.

An exemplary software product developed using a global software development process according to an embodiment of the invention is TDE-UML-PM, an integrated tool to generate and solve performance models from UML specifications. TDE-UML-PM stands for 3 acronyms: TDE: Test development Environment; UML: Unified Modeling Language; and PM: Performance Modeling. The TDE-UML-PM system can be decomposed into the following components, shown in FIG. 2. Performance Tool UI 21 provides a GUI to associate performance resource information with UML elements, while the UML Modeler 22 provides an editor to Performance Tool UI 21 to specify UML models. Performance Model Optimization Component 24 generates an optimized version of the input for the Performance Model Generator 23, which interfaces with Performance Tool UI 21 and extracts execution paths from UML models and adds performance information to create a PMIF. The PMIF Model Checker Component 27 verifies PMIF model representation OF Performance Model Optimization Component 24 for consistency. The PMIF Adapter Component 25 translates from the PMIF specification to the performance modeling component character based interface, and the Performance Analysis and Simulation Component 23 provides a character based interface to specify Performance Models and an engine to generate the model solution.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
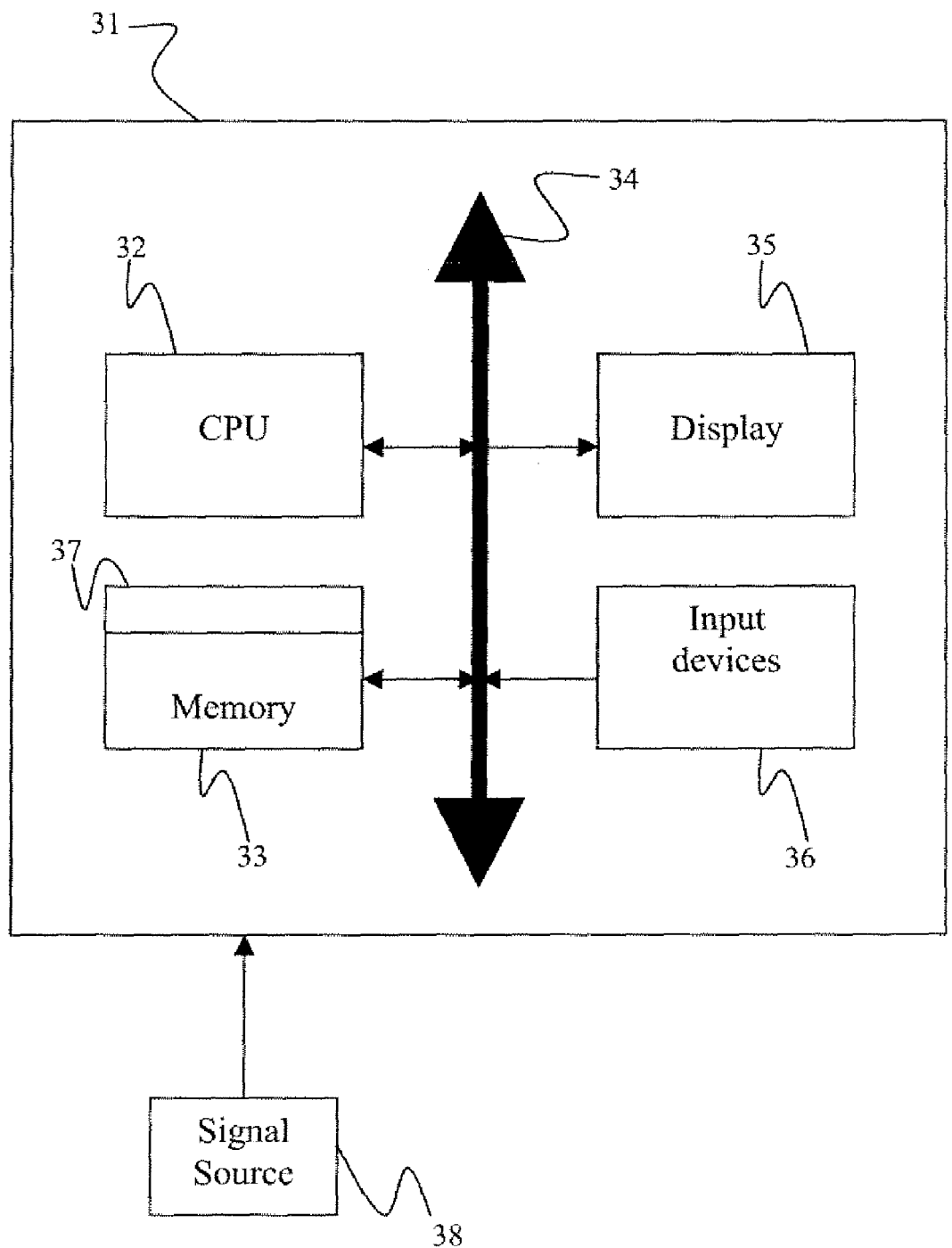
FIG. 3 is a block diagram of an exemplary computer system for implementing a method for global software development, according to an embodiment of the invention.

FIG. 3 is a block diagram of an exemplary computer system for implementing a method for global software development according to an embodiment of the invention. Referring now to FIG. 3, a computer system 31 for implementing the present invention can comprise, inter alia, a central processing unit (CPU) 32, a memory 33 and an input/output (I/O) interface 34. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-executed method for developing a software project comprising the steps of:
    identifying business cases and goals for the software project;
    defining a common interface architecture through which components of said software project are to be integrated;
    identifying software project components to be integrated over said common interface;
    defining high level requirements of said project components;
    elaborating the component interfaces and defining detailed component requirements;
    implementing said project components;
    testing said project components individually;
    defining integration tests for testing integrated components;
    executing said integration tests on a set of integrated components; and
    rating each developed software project according to a number of open defects existing after component feature development and testing time period by adding a predetermined number of points minus the number of open defects to a predetermined initial rating.

2. The method of claim 1, further comprising identifying a domain expert for each project component, wherein said domain experts define said high level requirements of said project components.

3. The method of claim 2, further comprising forming testing and development teams, wherein members of said testing and development teams are identified by the domain expert for each component.

4. The method of claim 3, wherein the steps of elaborating the component interfaces and defining detailed component requirements, implementing said project components, and testing said project components individually are performed by said development teams.

5. The method of claim 3, wherein the steps of defining integration tests for testing integrated components, and executing said integration tests on a set of integrated components are performed by said testing team.

6. The method of claim 1, further comprising, for each component, identifying component features that can be developed and tested over a time period on the order of a few weeks, and implementing said component features.

7. The method of claim 6, further comprising integrating component features into said software project on a website executing said common interface.

8. A computer-executed method for developing a software project comprising the steps of:
    identifying business cases and goals for the software project;
    identifying a domain expert for each project component, wherein said domain experts define said high level requirements of said project components;
    defining a common interface architecture through which components of said software project are to be integrated;
    identifying software project components to be integrated over said common interface;
    defining high level requirements of said project components;
    for each component, identifying component features that can be developed and tested over a time period on the order of a few weeks, and implementing said component features; and
    rating each developed software project according to a number of open defects existing after component feature development and testing time period by adding a predetermined number of points minus the number of open defects to a predetermined initial rating.

9. The method of claim 8, further comprising forming testing and development teams, wherein members of said testing and development teams are identified by the domain expert for each component.

10. The method of claim 9, further comprising:
    elaborating the component interfaces and defining detailed component requirements;
    implementing said project components; and
    testing said project components individually, wherein said steps are performed by said development teams.

11. The method of claim 9, further comprising:
    defining integration tests for testing integrated components; and
    executing said integration tests on a set of integrated components, wherein said steps are performed by said testing team.

12. The method of claim 8, further comprising integrating component features into said software project on a website executing said common interface.

13. A program storage memory device readable by a computer, tangibly embodying a program of instructions executable by the computer to perform the method steps for developing a software project comprising the steps of:

identifying business cases and goals for the software project;

identifying a domain expert for each project component, wherein said domain experts define said high level requirements of said project components;

defining a common interface architecture through which components of said software project are to be integrated;

identifying software project components to be integrated over said common interface;

defining high level requirements of said project components;

for each component, identifying component features that can be developed and tested over a time period on the order of a few weeks, and implementing said component features; and rating each developed software project according to a number of open defects existing after component feature development and testing time period by adding a predetermined number of points minus the number of open defects to a predetermined initial rating.

14. The computer readable program storage device of claim 13, the method further comprising forming testing and development teams, wherein members of said testing and development teams are identified by the domain expert for each component.

15. The computer readable program storage device of claim 14, further comprising:

elaborating the component interfaces and defining detailed component requirements;

implementing said project components; and testing said project components individually, wherein said steps are performed by said development teams.

16. The computer readable program storage device of claim 14, the method further comprising:

defining integration tests for testing integrated components; and executing said integration tests on a set of integrated components, wherein said steps are performed by said testing team.

17. The computer readable program storage device of claim 13, the method further comprising integrating component features into said software project on a website executing said common interface.

* * * * *